(12) United States Patent
Baird et al.

(10) Patent No.: US 7,451,794 B1
(45) Date of Patent: Nov. 18, 2008

(54) INTERNAL AIR PASSAGE IN A TAKE-APART WHEEL

(75) Inventors: Lindsey T. Baird, Canton, MI (US); Ross S. Hill, Lansing, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 150 days.

(21) Appl. No.: 11/320,147

(22) Filed: Dec. 28, 2005

(51) Int. Cl.
*B60C 7/24* (2006.01)
*B60C 23/10* (2006.01)
(52) U.S. Cl. .................... 152/405; 152/427
(58) Field of Classification Search ......... 152/415–416, 152/418, 427–428, 404–405, 409–410
See application file for complete search history.

(56) References Cited

U.S. PATENT DOCUMENTS

| | | | | |
|---|---|---|---|---|
| 2,871,905 A | * | 2/1959 | Stanton | 152/427 |
| 3,063,488 A | * | 11/1962 | Bennett et al. | 152/415 |
| 3,880,219 A | * | 4/1975 | Mitchell | 152/404 |
| 4,106,543 A | * | 8/1978 | Sano | 152/427 |
| 6,315,366 B1 | | 11/2001 | Post et al. | |
| 6,374,493 B1 | | 4/2002 | Howald | |
| 6,474,383 B1 | | 11/2002 | Howald et al. | |
| 6,497,262 B1 | * | 12/2002 | Skoff et al. | 152/415 |
| 7,168,468 B2 | * | 1/2007 | Wang et al. | 152/427 |

* cited by examiner

*Primary Examiner*—Jason R Bellinger
(74) *Attorney, Agent, or Firm*—MacMillan, Sobanski & Todd, LLC

(57) ABSTRACT

A take-apart safety vehicle wheel assembly includes an inner rim and an outer rim joined thereto. The inner rim includes an outer cylindrical surface and a generally radially extending disc portion. The outer rim includes a generally axially extending portion defining an inner cylindrical rim surface and a generally radially extending disc portion having an air passage formed therethrough. An air passage groove is formed in one of the inner rim and the outer rim, and extends from the air passage to a tire air chamber of the wheel.

20 Claims, 3 Drawing Sheets

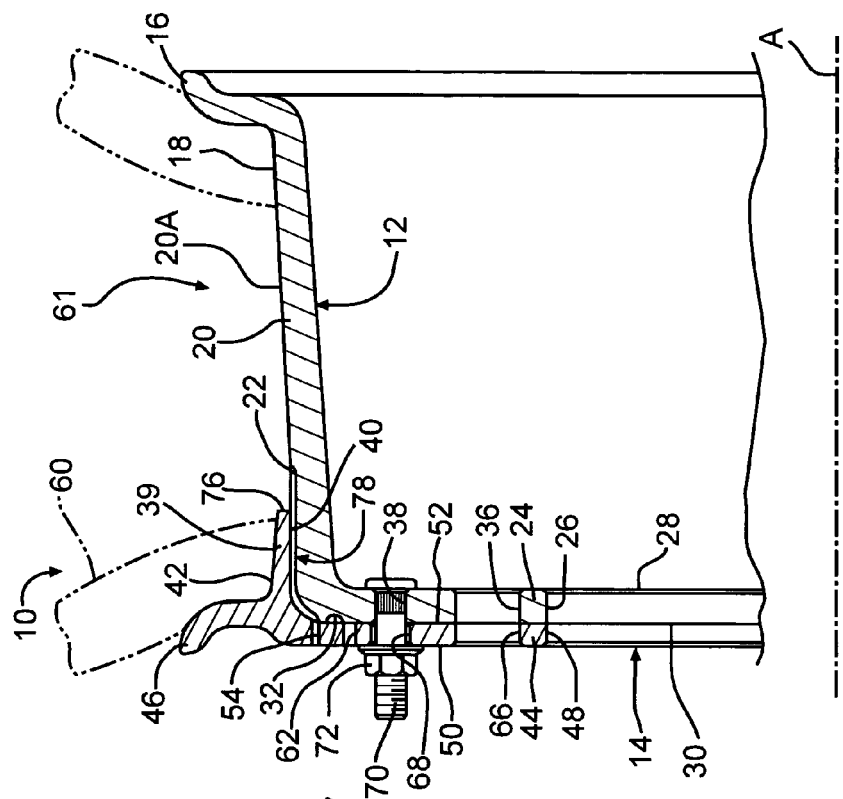
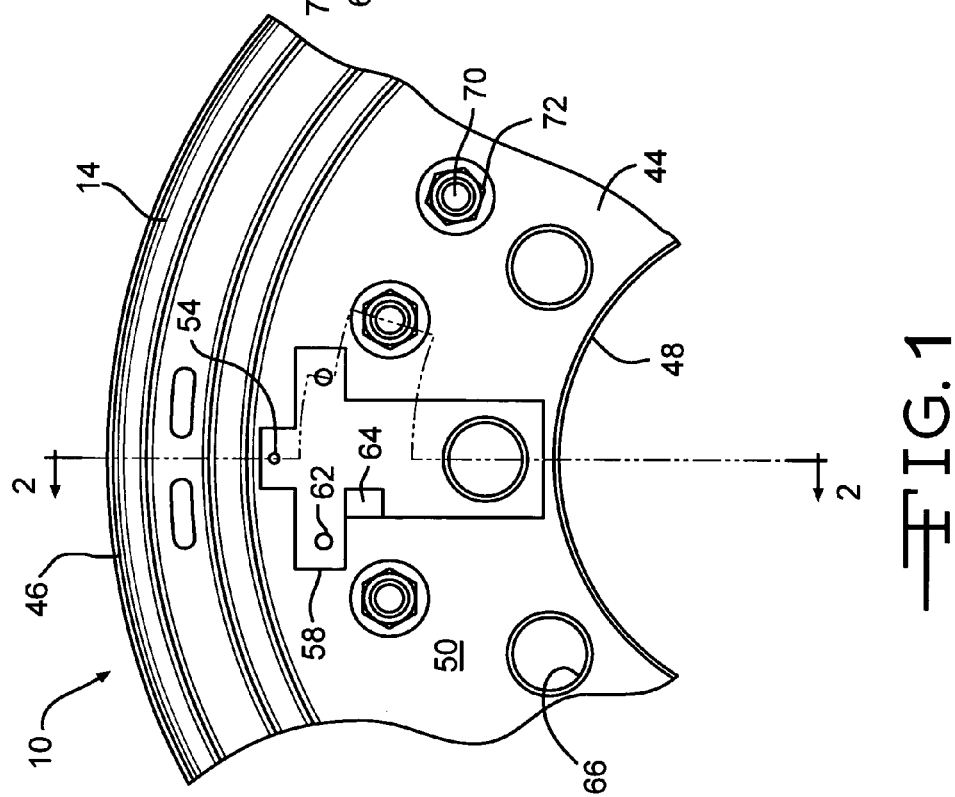

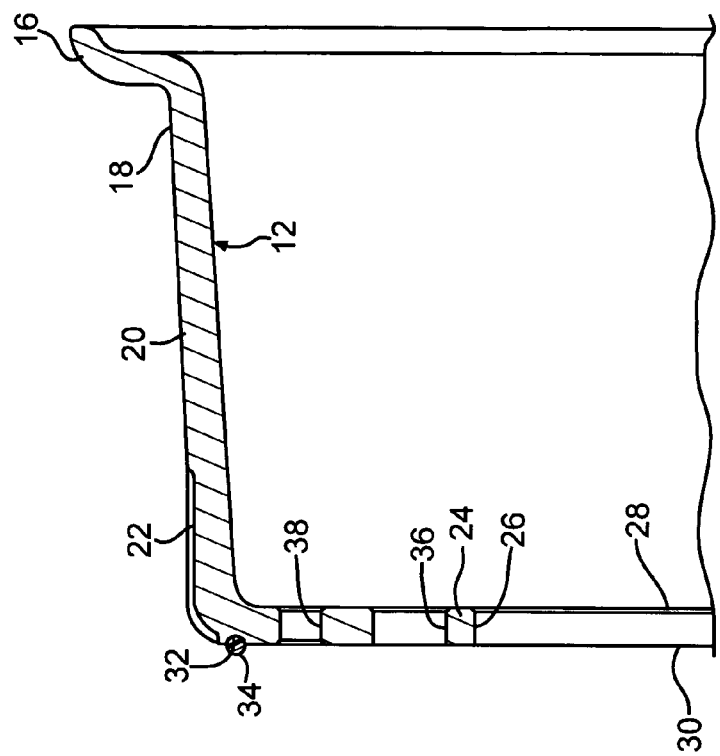
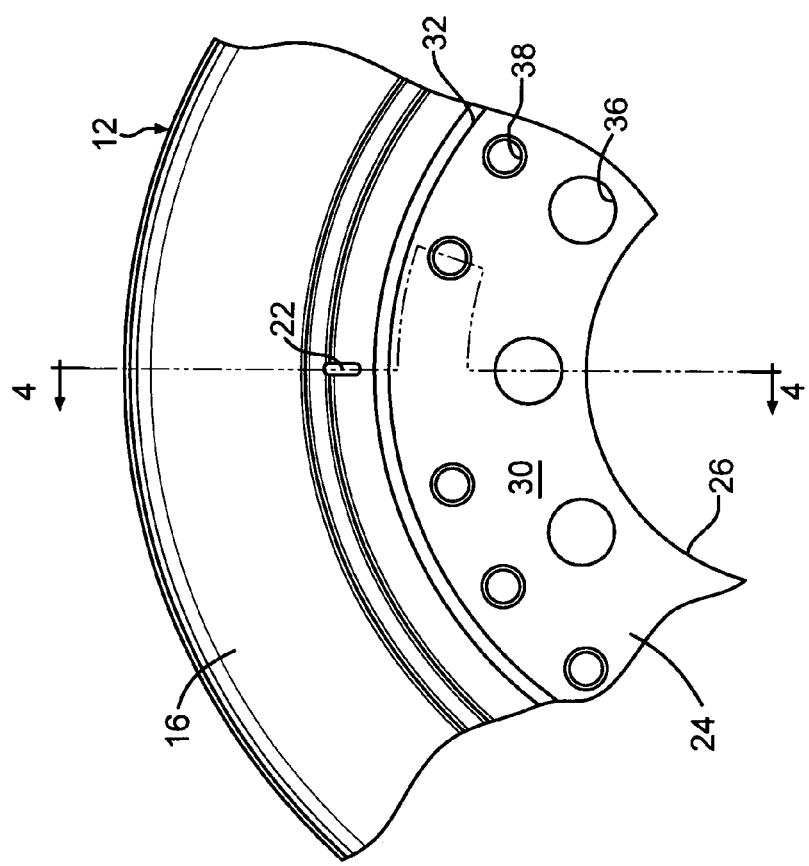

INTERNAL AIR PASSAGE IN A TAKE-APART WHEEL

BACKGROUND OF THE INVENTION

The present invention relates generally to vehicle wheel assemblies and in particular to an improved take-apart safety vehicle wheel assembly.

U.S. Pat. No. 6,315,366 to Post et al. discloses a prior art take-apart safety vehicle wheel assembly. As shown in the Post et al. patent, the prior art take-apart safety vehicle wheel assembly includes an inner rim, an outer rim, and a wheel mounting disc. The wheel mounting disc includes an outer cylindrical surface and is welded to the inner rim. Threaded stud bolts extend through apertures formed through the wheel mounting disc and the outer rim. Nuts are installed on and tightened on the stud bolts to secure the outer rim to the wheel mounting disc.

As further shown in the embodiment of FIG. 1 in the Post et al. patent, the outboard tire bead seat surface of the inner rim terminates at a chamfered surface. When the safety take apart vehicle wheel assembly is assembled, a generally equilateral triangle shaped cavity is defined between an inner surface of the outer rim, the chamfered surface of the inner rim, and the outer cylindrical surface of the disc. An elastomeric seal is disposed in the triangular shaped cavity and is compressed between the opposing surfaces of the wheel assembly to prevent air leakage. When the nuts on the threaded stud bolts are loosened, air can move past the elastomeric seal prior to the nuts being removed from the studs.

SUMMARY OF THE INVENTION

The present invention relates to a take-apart safety vehicle wheel assembly. The take-apart safety vehicle wheel assembly includes an inner rim and an outer rim joined thereto. The inner rim includes an outer cylindrical surface and a generally radially extending disc portion. The outer rim includes a generally axially extending portion defining an inner cylindrical rim surface and a generally radially extending disc portion having an air passage formed therethrough. An air passage groove is formed in one of the inner rim and the outer rim, and extends from the air passage to a tire air chamber of the wheel.

Other advantages of this invention will become apparent to those skilled in the art from the following detailed description of the invention, when read in light of the accompanying drawings.

BRIEF DESCRIPTION OF THE DRAWINGS

FIG. 1 is a front elevational view of a portion of a first embodiment of a take-apart safety vehicle wheel assembly constructed in accordance with this invention.

FIG. 2 is an enlarged sectional view of the take-apart safety vehicle wheel assembly taken along 2-2 of FIG. 1.

FIG. 3 is a front elevational view of a portion of the inner rim illustrated in FIGS. 1 and 2.

FIG. 4 is an enlarged sectional view of the inner rim taken along line 4-4 of FIG. 3.

DETAILED DESCRIPTION OF THE INVENTION

Figure 6:
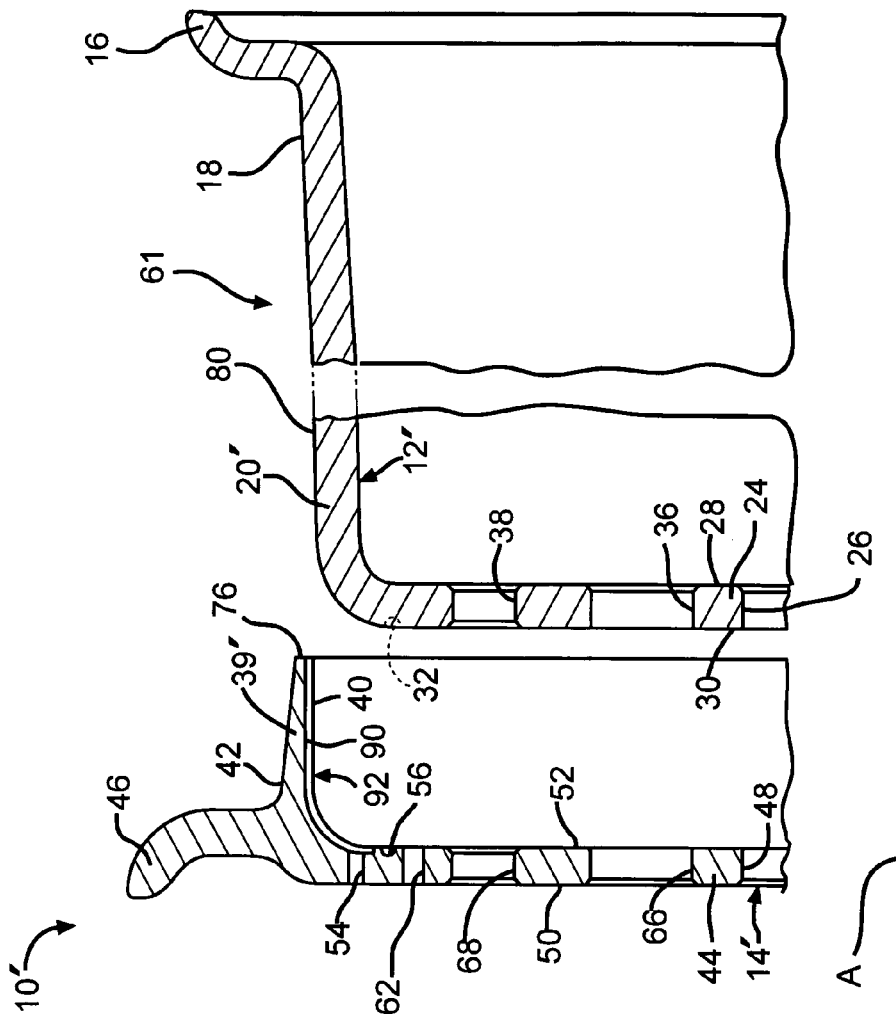
FIG. 6 is an enlarged expanded sectional view of a portion of a second embodiment of a take-apart safety vehicle wheel assembly constructed in accordance with this invention.

Referring now to the drawings, there is illustrated in FIGS. 1 and 2 a first embodiment of a take-apart safety vehicle wheel assembly, indicated generally at 10, and constructed in accordance with the present invention. In the illustrated embodiment, the take-apart safety vehicle wheel assembly 10 includes an inner rim 12 and an outer rim 14, and defines an axis A. The inner rim 12 may be fabricated or otherwise formed from a suitable material, such as for example, steel, aluminum, magnesium, titanium, alloys thereof, or other metals or alloy material. As best shown in FIG. 4, the inner rim 12 may include an inboard tire bead seat retaining flange 16, an inboard tire bead seat 18, and a generally axially extending well or barrel portion 20 defining an outer cylindrical surface 20A. In the illustrated embodiment, an air passage groove 22 is formed in the barrel portion 20. The purpose of the air passage groove 22 will be explained in detail below.

The illustrated inner rim 12 further includes a generally radially extending disc portion 24 which includes a centrally located pilot aperture 26. The illustrated disc portion 24 includes a generally centrally located inner wheel surface 28 and an outer rim mounting surface 30 opposite the inner wheel surface 28. The outer rim mounting surface 30 may be provided with a generally circular sealing groove 32 formed therein for receiving an elastomeric seal 34, such as an o-ring (not shown in FIG. 2, but shown in FIG. 4). It will be understood that the sealing groove 32 is not required and the inner rim 12 may be formed without such a groove 32.

A plurality of lug bolt receiving holes 36 (only one of such lug bolt receiving holes 36 is shown in FIGS. 2 and 4), and a plurality of stud receiving holes 38 (only one of such stud receiving holes 38 is shown in FIGS. 2 and 4), may be spaced circumferentially around the pilot aperture 26. The lug bolt receiving holes 36 receive lug bolts and nuts (not shown) for securing the wheel assembly 10 on an axle (not shown) of a vehicle.

Figure 5:
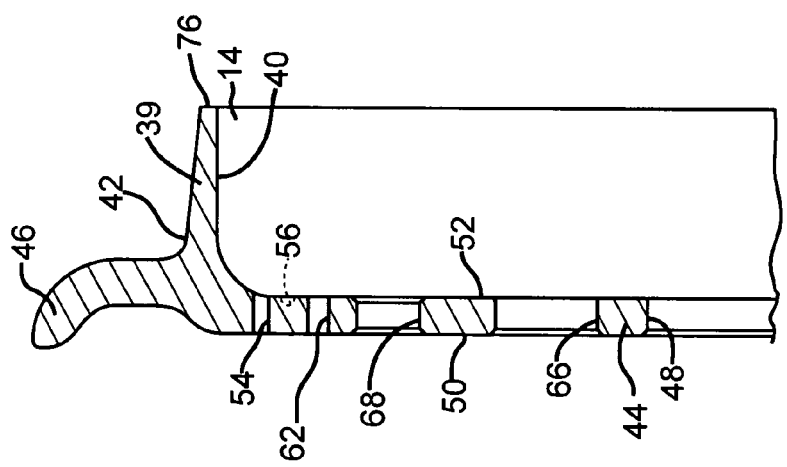
FIG. 5 is an enlarged sectional view of the outer rim illustrated in FIG. 2.

The illustrated outer rim 14 may be fabricated or otherwise formed from a suitable material, such as for example, steel, aluminum, magnesium, titanium, alloys thereof, or other metals or alloy material. As best shown in FIG. 5, the outer rim 14 includes a generally axially extending portion 39 having an inner cylindrical rim surface 40, an outboard tire bead set 42, a generally radially extending disc portion 44, and an outer annular or outboard tire bead seat retaining flange 46. The generally radially extending disc portion 44 includes a centrally located pilot aperture 48. The illustrated radially extending disc portion 44 includes an outer wheel surface 50, an inner rim mounting surface 52, and has an air passage 54 formed therethrough. If desired, the inner rim mounting surface 52 may be provided with a sealing groove 56 (as shown in phantom in FIG. 5) formed therein as an alternative to the sealing groove 32 of the inner rim 12. Alternatively, the sealing groove 56 may be provided and arranged to cooperate with the sealing groove 32 of the inner rim 12 so that both the sealing grooves 56 and 32 receive the elastomeric seal 34. It will be understood that the sealing grooves 32 and 56 are not required, and the inner rim 12 and the outer rim 14, may be respectively formed without such grooves 32 and 56.

An air valve assembly, such as a central tire inflation system (CTIS), shown schematically at 58 in FIG. 1, may be mounted to the outer wheel surface 50 for providing air to a tire (an inflated tire being shown in phantom at 60 in FIG. 2). As best shown in FIG. 1, the tire 60 and the wheel assembly 10 cooperate to define a tire air chamber 61. As best shown in FIGS. 1 and 5, fastener receiving holes 62 (only two such holes 62 are shown in FIG. 1) may be formed adjacent the air passage 54. The fastener receiving holes 62 receive fasteners (not shown) for securing the CTIS 58 to the outer wheel surface 50 of the outer rim 14. The CTIS 58 may include a threaded valve (shown schematically at 64 in FIG. 1) for inputting air from a source of compressed air. Alternatively, a conventional threaded rim valve (not shown) may be disposed in the air passage 54 of the outer rim 14.

The radially extending disc portion 44 of the outer rim 14 may include a plurality of lug bolt receiving holes 66 (only one of such lug bolt receiving holes 66 is shown in FIG. 5), and a plurality of stud receiving holes 68 (only one of such stud receiving holes 68 is shown in FIG. 5), may be spaced circumferentially around the pilot aperture 48. The stud receiving holes 38 and 68 of the disc portion 24 or the inner rim 12 and the disc portion 44 of the outer rim 14, respectively, may receive stud bolts 70 and nuts 72 to secure the outer rim 14 and the inner rim 12 together.

As best shown in the embodiment illustrated in FIG. 2, the axially extending portion 39 of the outer rim 14 terminates at a generally radially extending endmost surface 76. When the wheel assembly 10 is assembled, the air passage 54, the inner cylindrical rim surface 40, the generally radially extending endmost surface 76, and the air passage groove 22 cooperate to define a wheel assembly air passage, as indicated generally at 78.

As best shown in FIG. 4, the elastomeric seal 34 is disposed in the sealing groove 32 for providing an air-tight seal between the outer rim mounting surface 30 of the inner rim 12 and the inner rim mounting surface 52 of the outer rim 14 when the nuts 72 are tightened on the bolts 70 to compress the seal 34 between the sealing groove 32 and the inner rim mounting surface 52.

The threads on the stud bolts 70 may extend a sufficient distance outwardly (to the left as viewed in FIG. 2), so that in the event that the nuts 72 are loosened with the tire 60 inflated, air can move past the elastomeric seal 34 to the atmosphere prior to the nuts 72 being removed from the stud bolts 70.

Referring now to FIG. 6, and using like reference numbers to indicate corresponding parts, there is illustrated a side elevational view of a second alternate embodiment of a take-apart safety vehicle wheel assembly, indicated generally at 10' in accordance with this invention. As shown therein, the wheel assembly 10' includes an inner rim 12' and an outer rim 14'. In the exemplary embodiment illustrated, the inner rim 12' includes the inboard tire bead seat retaining flange 16, the inboard tire bead seat 18, and a generally axially extending barrel portion 20' defining an outer cylindrical surface 80.

The illustrated inner rim 12' further includes the generally radially extending disc portion 24, which includes the pilot aperture 26. If desired, the outer rim mounting surface 30 may be provided with the sealing groove 32 formed therein for receiving the elastomeric seal 34.

The illustrated outer rim 14' includes a generally axially extending portion 39' having an inner cylindrical rim surface 40, the outboard tire bead seat 42, the generally radially extending disc portion 44, and the outboard tire bead seat retaining flange 46. In the exemplary embodiment illustrated, an air passage groove 90 is formed in the inner cylindrical rim surface 40 and extends between the endmost surface 76 and the air passage 54. If desired, the inner rim mounting surface 52 may be provided with the sealing groove 56 formed therein for receiving the elastomeric seal 34. The groove 56 may be provided as an alternative to the sealing groove 32 of the inner rim 12'. Alternatively, the sealing groove 56 may be provided to cooperate with the sealing groove 32 of the inner rim 12' to receive the elastomeric seal 34.

When the inner rim 12' and an outer rim 14' are assembled, the air passage 54, the outer cylindrical surface 80, and the air passage groove 90 cooperate to define a wheel assembly air passage 92. The operation of the take-apart safety vehicle wheel assembly 10' is otherwise identical to that of the take-apart safety vehicle wheel assembly 10.

It will be understood that the air passage groove, such as the air passage groove 90, may be formed in the inner cylindrical rim surface 40, as shown in FIG. 6. Additionally, the air passage groove, such as the air passage groove 22, may be formed in the barrel portion 20, as shown in FIG. 4. Alternatively, a take-apart safety vehicle wheel assembly 10, 10', may be formed having both the air passage groove 90 formed in the inner cylindrical rim surface 40, and the air passage groove 22 formed in the barrel portion 20, such that the air passage groove 90 and the air passage groove 22 cooperate to define a portion of the wheel assembly air passage, such as the wheel assembly air passages 78 and 92.

As best shown in FIGS. 2 and 6, respectively, an axially inboard end of the wheel assembly air passage 78, and an axially inboard end of the wheel assembly air passage 92 are within the tire air chamber 61. Additionally, the sealing grooves 32 and 56, and the elastomeric seal 34 are disposed at a radially outboard side of the wheel 10, 10', between the wheel axis A and the wheel assembly air passages 78 and 92. In the embodiments illustrated in FIGS. 2 and 6, the sealing grooves 32 and 56, and the elastomeric seal 34 are disposed radially inboard of, and adjacent the air passage 54.

The air passage groove 22, 90 may be integrally cast or otherwise formed within the inner rim 12 and the outer rim 14, respectively, thereby eliminating the need to drill or bore air holes in the wheel assembly 10.

Although the take-apart safety vehicle wheel assembly 10 has been described in the context of a two-part wheel assembly, it will be understood that the wheel assembly may include any desired number of component parts, such as three or more parts.

The principle and mode of operation of this invention have been described in its various embodiments. However, it should be noted that this invention may be practiced otherwise than as specifically illustrated and described without departing from its scope.

What is claimed is:

1. A take-apart safety vehicle wheel assembly comprising:
   an inner rim including an axially extending portion defining an outer cylindrical surface and a generally radially extending disc portion; and
   an outer rim joined to said inner rim, said outer rim including a generally axially extending portion defining an inner cylindrical rim surface and a generally radially extending disc portion, said generally radially extending disc portion having an air passage formed therethrough;
   wherein said inner cylindrical rim surface of said axially extending portion of said outer rim engages a portion of said outer cylindrical surface of said axially extending portion of said inner rim; and
   wherein an air passage groove is formed between said outer cylindrical surface of said inner rim and said inner cylindrical rim surface of said axially extending portion of said outer rim, and extends from said air passage to a tire air chamber of the wheel.

2. The take-apart safety vehicle wheel assembly according to claim 1, wherein said air passage groove is formed in one of said axially extending portion of said inner rim and said inner cylindrical rim surface of said outer rim.

3. The take-apart safety vehicle wheel assembly according to claim 1, further including an elastomeric member disposed between said inner rim and said outer rim.

4. The take-apart safety vehicle wheel assembly according to claim 3, wherein said elastomeric member is disposed radially inwardly of said air passage and said air passage groove.

5. The take-apart safety vehicle wheel assembly according to claim 1, wherein said generally radially extending disc portion of said inner rim includes an outer rim mounting surface, and said generally radially extending disc portion of said outer rim includes an inner rim mounting surface, and wherein a sealing groove is formed in one of said outer rim mounting surface of said inner rim and said inner rim mounting surface of said outer rim, said take-apart safety vehicle wheel assembly further including an elastomeric member disposed in said sealing groove.

6. The take-apart safety vehicle wheel assembly according to claim 5, wherein said elastomeric member is disposed radially inwardly of said air passage and said air passage groove.

7. The take-apart safety vehicle wheel assembly according to claim 5, wherein said disc portion of said outer rim is joined to said disc portion of said inner rim by mechanical fastening means, said mechanical fastening means adapted to compress said elastomeric member in said sealing groove to provide an air-tight seal in said take-apart safety vehicle wheel assembly between said inner rim and said outer rim.

8. The take-apart safety vehicle wheel assembly according to claim 1, wherein said air passage groove and said air passage define a wheel assembly air passage.

9. The take-apart safety vehicle wheel assembly according to claim 3, wherein said air passage groove and said air passage define a wheel assembly air passage.

10. The take-apart safety vehicle wheel assembly according to claim 9 further including an axis, wherein said elastomeric member is disposed between said axis and said wheel assembly air passage.

11. A method of manufacturing a take-apart safety vehicle wheel assembly, the method comprising:
forming an inner rim having an axially extending portion defining an outer cylindrical surface and a generally radially extending disc portion;
forming an outer rim having a generally axially extending portion defining an inner cylindrical rim surface and a generally radially extending disc portion, the generally radially extending disc portion having an air passage formed therethrough;
forming an air passage groove between the outer cylindrical surface of the inner rim and the inner cylindrical rim surface of the axially extending portion of the outer rim, the air passage groove extending from the air passage to a tire air chamber of the wheel; and
joining the outer rim to the inner rim, such that the inner cylindrical rim surface of the axially extending portion of the outer rim engages a portion of the outer cylindrical surface of the axially extending portion of the inner rim, thereby forming a take-apart safety vehicle wheel assembly.

12. The method according to claim 11 further including forming the air passage groove in one of the axially extending portion of the inner rim and the inner cylindrical rim surface of the outer rim.

13. The method according to claim 11 further including disposing an elastomeric member between the inner rim and the outer rim.

14. The method according to claim 13 further including disposing elastomeric member radially inwardly of the air passage and the air passage groove.

15. The method according to claim 11, wherein the generally radially extending disc portion of the inner rim includes an outer rim mounting surface, and the generally radially extending disc portion of the outer includes an inner rim mounting surface, and further including forming a sealing groove in one of the outer rim mounting surface of the inner rim and the inner rim mounting surface of the outer rim and disposing an elastomeric member in the sealing groove.

16. The method according to claim 15, wherein the sealing groove is formed radially inwardly of the air passage and the air passage groove.

17. The method according to claim 15, wherein the joining step includes joining the disc portion of the outer rim to the disc portion of the inner rim by mechanical fastening means, the mechanical fastening means adapted to compress the elastomeric member in the sealing groove to provide an airtight seal in the take-apart safety vehicle wheel assembly between the inner rim and the outer rim.

18. The method according to claim 11 wherein the air passage groove and the air passage define a wheel assembly air passage.

19. The method according to claim 15, wherein the air passage groove and the air passage define a wheel assembly air passage.

20. The method according to claim 19, wherein the take-apart safety vehicle wheel assembly includes an axis, and further including disposing the elastomeric member between the axis and the wheel assembly air passage.

* * * * *